March 2, 1948.  A. T. SINKS  2,437,132

REMOTE INDICATING COMPASS

Filed Nov. 17, 1943  3 Sheets-Sheet 1

TRANSMITTER

RECEIVER

Inventor:
Allen T. Sinks,
by  Harry E. Dunham
His Attorney.

March 2, 1948.  A. T. SINKS  2,437,132
REMOTE INDICATING COMPASS
Filed Nov. 17, 1943   3 Sheets-Sheet 2
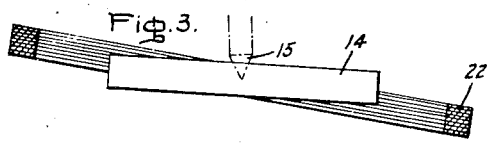
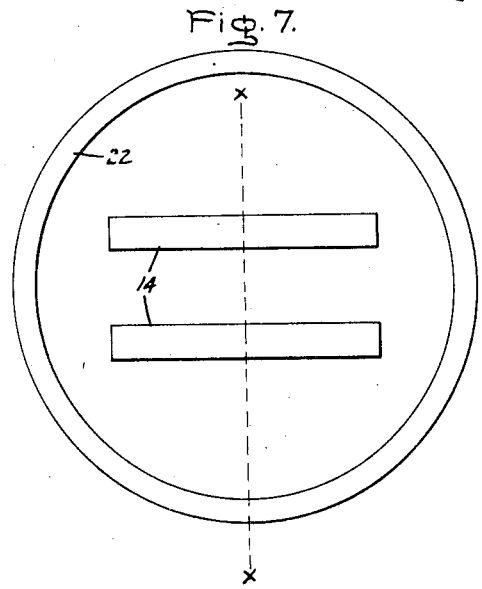
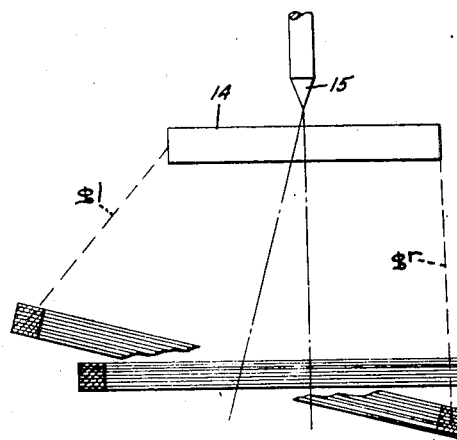
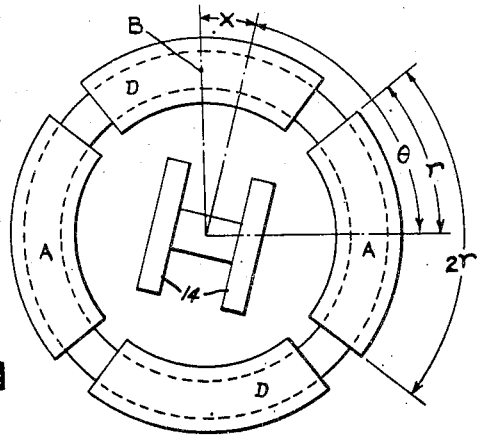
Inventor:
Allen T. Sinks,
by Harry E. Dunham
His Attorney.

Patented Mar. 2, 1948

2,437,132

UNITED STATES PATENT OFFICE 2,437,132

REMOTE INDICATING COMPASS

Allen T. Sinks, Beach Bluff, Mass., assignor to General Electric Company, a corporation of New York Application November 17, 1943, Serial No. 510,614

4 Claims. (Cl. 177—351)

My invention relates to a remote indicating compass, and its object is to provide such apparatus suitable for use on airplanes and wherein errors which would otherwise exist in the transmitter are eliminated.

Figure 1:
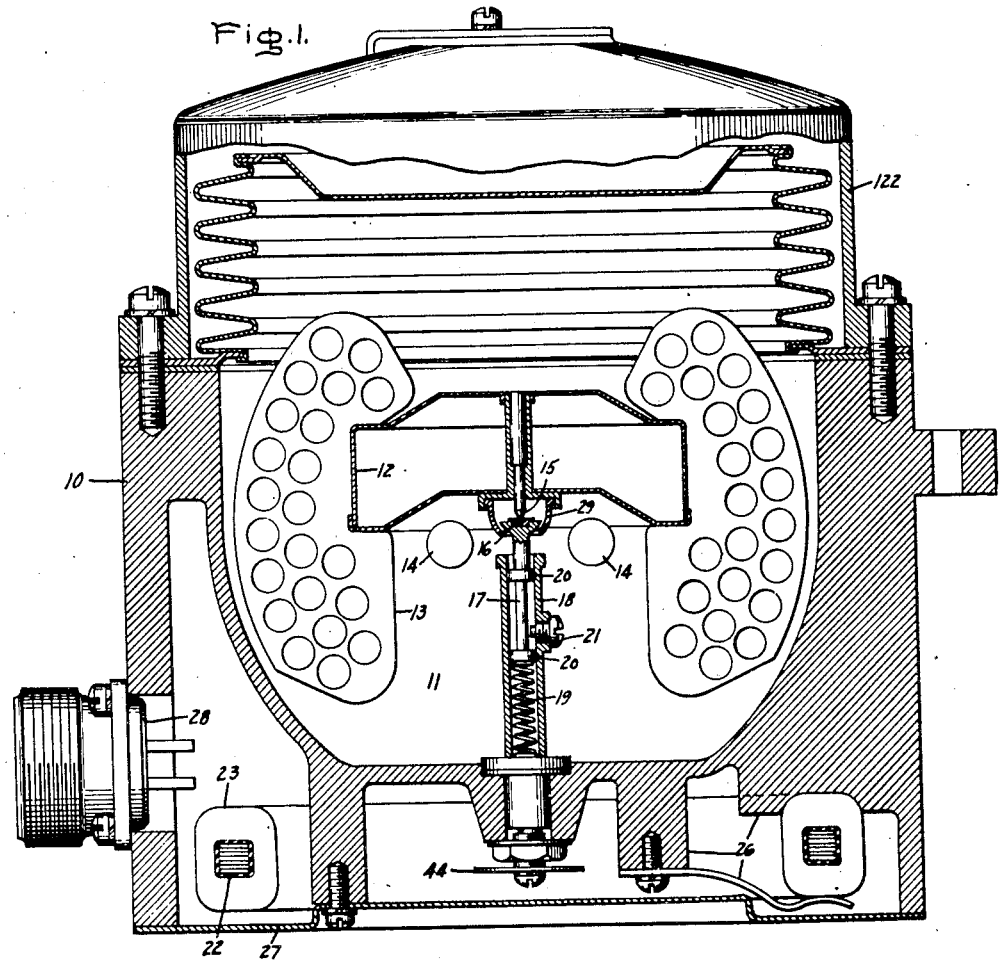
Figure 2:
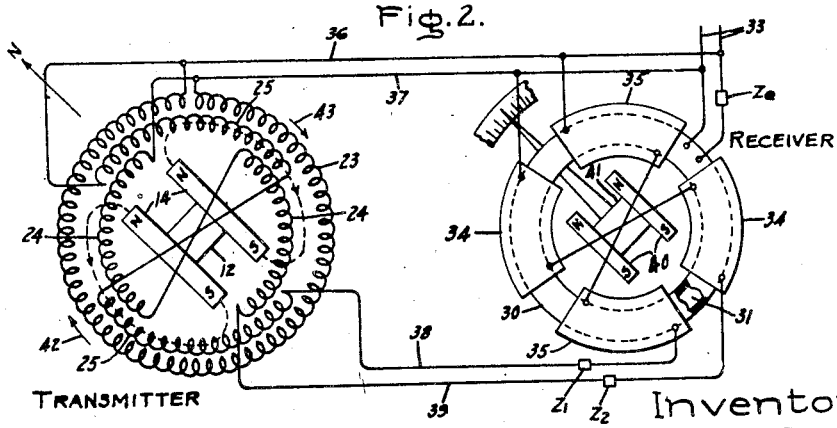
Figure 4:
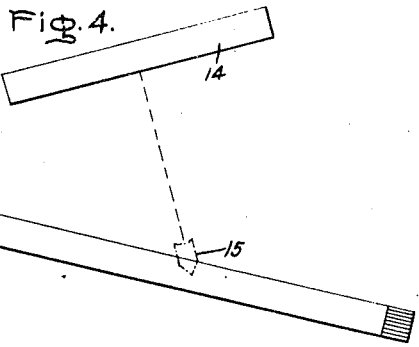
Figure 8:
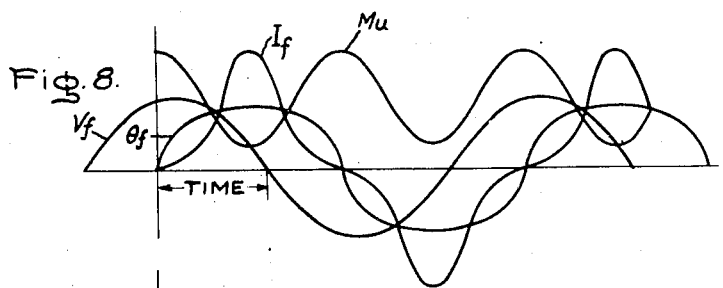
Figure 9:
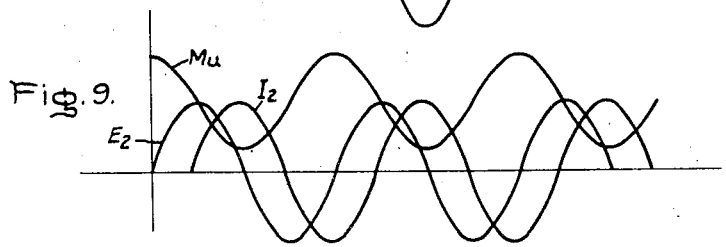
Figure 10:
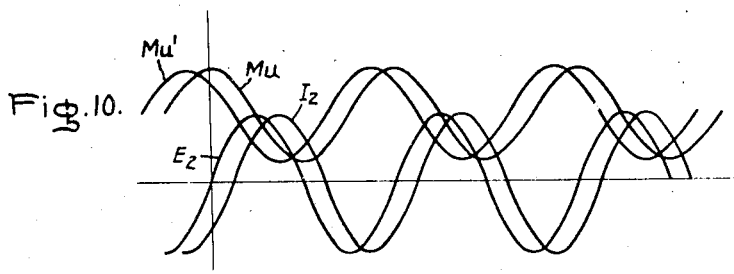
Figure 11:
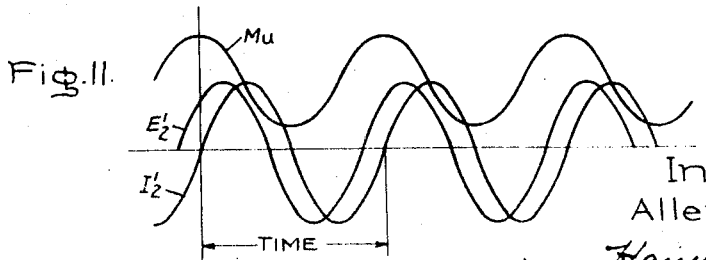

The features of my invention which are believed to be novel and patentable will be pointed out in the claims appended hereto. For a better understanding of my invention, reference is made in the following description to the accompanying drawings in which Fig. 1 shows a side view partially in section of a compass transmitter embodying my invention; Fig. 2 shows the electrical connections of transmitter and receiver; Figs. 3, 4 and 6 represent undesirable arrangements of compass transmitter parts for the purpose of explaining errors compensated for when the same parts are rearranged according to Figs. 1, 2 and 5; Fig. 7 represents a plan view of compass magnet and transmitter core; Fig. 8 shows curves of the fundamental excitation voltage, excitation current, and excitation flux of the transmitter; Fig. 9 shows curves of the average permeability variation in the transmitter core, together with resulting second harmonic generated volts and current curves in the transmitter, characteristic of an undesirable, low power factor, second harmonic circuit condition; Fig. 10 shows curves corresponding to those of Fig. 9, but for a power factor condition modified in accordance with one aspect of the present invention and with the permeability curve of the receiver added; and Fig. 11 shows the permeability curve of the transmitter and the second harmonic voltage and current curve of the receiver for such modified power factor, second harmonic circuit condition.

Referring to the drawings, and particularly to Fig. 1, I have shown a suitable casing 10 of nonmagnetic material having a liquid tight inner chamber 11. Such chamber is adapted to contain a suitable liquid for largely supporting a compass card structure consisting of a float 12, damping wings 13, and a pair of permanent magnets 14. A plan view of the magnets is shown in Fig. 7. The compass card structure includes a pivot 15 resting on a jewel bearing 16 so as to permit rotation of the compass card structure as well as tipping movement relative to the jewel in order that when the airplane or other structure on which the compass is mounted departs from a level position, the compass card which is designed to be pendulous will remain with the axis of its magnets 14 substantially level. The jewel bearing is supported on a rod 17 slidably mounted in a cylinder 18 and urged upward by a spring 19. Sliding movement of the rod is permitted between the limits determined by collars 20 on the rod and a stop screw 21. This provides a cushion support for that part of the weight of the compass card structure not supported by the liquid, and prevents injury to the pivot bearing in case of shock and vibration. A collar 29 prevents the compass card structure from becoming unseated by reason of inversion of the apparatus. A resilient bellows closes the top of the inner chamber to permit expansion and contraction of the liquid. The inner chamber is filled with kerosene oil, for example, and supports the greater part of the weight of the compass card structure. The baffles 13 serve as damping means. The top of the casing may be protected by a cap 122.

In the operation of this device the magnets 14 align themselves with the earth's magnetic field, but they are made appreciably stronger than is necessary for ordinary compass operation in order that the compass card structure may serve as the rotor of an electromagnetic telemetering transmitter for transmitting the compass reading to one or more remote points. Thus the magnets 14 simultaneously serve a double function. The stator of such transmitter consists of an annular core 22 of high permeability but saturable magnetic material, such as Mumetal, on which are wound an exciting winding 23 and a coupling winding having two groups of coils 24 and 25 (see Fig. 2). It is seen that the stator is mounted well below the position of compass magnets 14 and is supported in the base of the casing concentric with the axis of pivot rod 17 and parallel to the magnets 14 when the compass card and casing are in a level position represented in Fig. 1. The stator is firmly supported in place at three or more points by suitable supporting structure, such as is represented at 26. The bottom of the casing may be closed by a protective closure 27, and the leads for the windings may be brought out to plug connections, one of which is indicated at 28.

The telemetering system employed utilizes the second harmonic principle of application Serial No. 461,710, filed October 12, 1942, to Hendrik D. Middel, Position indicator, assigned to the same assignee as the present invention and which case has become abandoned. Both the transmitter represented at the left in Fig. 2 and the receiver represented at the right in Fig. 2 have primary exciting and polyphase secondary coupling windings wound on a stationary ring core. The primary exciting winding of the receiver is indicated at 30, and, like the primary exciting winding of the transmitter, is uniformly distributed over the complete ring core represented at 31. These windings are energized in parallel from a constant frequency source of alternating current 33 and produce alternating current fluxes first in one direction and then in the other about their ring cores. These windings are wound and connected to produce fluxes in the same direction simultaneously in the two devices. Except for the overlapping relation of the secondary coupling coils 24 and 25 on the transmitter, said relation not always being essential on the receiver, the coupling coils on the receiver may be considered to be similar and comprise the pair 34 corresponding to coils 24 of the transmitter and the pair 35 corresponding to coils 25 of the transmitter. The coupling coils of each pair are wound on diametrically opposite sides of their cores and are connected in series opposition. Thus coils 34 of the receiver are on opposite sides of the core, are connected in series, and, if energized, would produce bucking fluxes about core 31. The two pairs of coupling coils on transmitter and receiver are displaced in quadrature relation. Thus coils 34 are in quadrature displaced relation with respect to coils 35 on core 31. The similarly placed pairs of coupling coils on transmitter and receiver are connected in series opposition. Thus coils 24 on the transmitter are connected in series opposition to coils 34 on the receiver. Coils 25 on the transmitter are connected in series opposition with coils 35 on the receiver. In interconnecting the transmitter and receiver, I may make use of the alternating current supply lines 36 and 37 which run between them. The interconnection between coils 25 and 35 may be traced as follows: From the receiver upper coil 35 through wire 36 to the transmitter upper coil 25 through lower coil 25, and through wire 38 back to the lower coil 35 of the receiver. Similarly the coils 24 and 34 make use of the other supply wire 37 and the wire 39 for their interconnection. It is possible to thus utilize wires 36 and 37 for the double purpose, since there is no interconnection between these wires through the two groups of coupling coils and their connections forming the polyphase interconnecting system between transmitter and receiver.

The rotating element of the transmitter is the previously mentioned compass card structure of Fig. 1, the compass magnets of which are represented at 14 in Fig. 2, with supporting structure which may diagrammatically represent the float supporting structure 12 of Fig. 1. The particular shape of the magnets 14 as shown is not essential. The rotating element of the receiver comprises a pair of parallel permanent magnets 40 suitably supported for rotation concentrically within the receiver stator element by a member 41. The stator and rotor parts of the receiver are structurally considerably smaller than those of the transmitter. The receiver is designed with a view of being mounted at any angle on a crowded instrument panel, while the compass transmitter may be mounted in an airplane wing or otherwise where there is ample room and a minimum of disturbing influence. The magnets of the compass card align themselves with the earth's field, as indicated in Fig. 2, and also produce a unidirectional flux in the core of the transmitter, as indicated in dotted lines in Fig. 2. This flux combines with the alternating flux in the core produced by the exciting winding 23 to produce a saturated condition of the core on one side which shifts to the opposite side with reversal of the alternating current flux. Thus in Fig. 2 when the alternating current flux is in the direction represented by arrows 42 and 43, that side adjacent arrow 43 is saturated and when the alternating current flux reverses, the side adjacent arrow 42 becomes saturated.

The voltages induced in the reversely connected coupling coils of a pair in the transmitter are therefore no longer equal and opposite but unequal and opposite, and a resultant predominating double frequency voltage is induced in the coupling coils. Corresponding currents flow in the coupling coils of the receiver and react with the excitation flux of the core thereof to produce a directional effect in flux with which the rotor magnets of the receiver align themselves to reproduce the indication of the transmitter compass card. Relative rotation between stator and rotor of the transmitter is reproduced in the receiver. The present invention is not concerned with this principle of telemetering but rather with features for the elimination of certain errors.

One source of error is the deviation of the transmitter magnet 14 from a normal N and S axis due to very slight but unavoidable dissymmetry in the shape and position of the ring core 22. The field created by the magnet in the vicinity of the ring core 22 is so much greater than the earth's field acting on the magnet that a very small unbalance of the former will cause considerable deviation of the magnet from the normal position it assumes in the earth's field. This error, if present, is compensated for by the use of a small elongated strip of magnetic material 44, Fig. 1, positioned within the ring core 22 and adjustable relative to the axis thereof so that its longitudinal axis may be rotated in any desired direction. The magnitude and direction of the magnetic unbalance of the ring core determines the size, position, and orientation of strip 44.

Another source of error of the same character arises from a tilting of the ring core due to tilting of the plane on which it is mounted. While it is theoretically possible to mount the ring core and compass magnet on gimbals and pivots so that both will remain horizontal, it is much more practicable to allow the ring core 22 to tilt with the plane, or other structure on which it is mounted. I have found that if the magnets 14 are relatively far away from the ring core 22, the effect of tilting of the ring is very slight up to tilts of the order of 10 degrees. However, a large spacing results in low output from the transmitter as well as a large case to contain the two elements on account of the spacing between them. I have found that the magnets 14 can be mounted relatively nearer the ring core 22 as represented in Fig. 1 without producing much error due to tilt, if a certain relation between the position of the pivot 15 above or below the magnet 14 and the position of the magnet above the ring 22 is maintained. For instance, for magnet and ring of the relative dimensions indicated in Figs. 3, 4, and 5, using a ring core 22 of 3⅝ inches outside diameter and magnets 2³⁄₁₆ inches long x .265 inch in diameter spaced 0.8 inch apart, it was found that the error due to tilt was reduced to a very small degree when the center of the magnets was 1¼ inches above the center of the ring and the pivot ¼ inch below the center of the magnet, and a similar condition was obtained when the center of the magnets was 1¾ inches above the center of the ring and the pivot point ¼ inch above the center of the magnets. The latter arrangement is represented in Fig. 5. Other relations of ring diameter, length of magnet, spacing of magnet and ring and point of pivot of magnet would be satisfactory but due to the complications involved in calculating such relations, they should be checked by actual trial before adoption. The reason for the tilt error and for its elimination in the example given can be explained in connection with Figs. 3 and 4, 5 and 7, Figs. 3 and 4 being arrangements subject to an intolerable tilt error and included for explanatory purposes only. In Fig. 3 it is evident that, with the magnets 14 mounted in the plane of the ring magnetic core 22, if the ring is tilted, the magnet will tend to tilt with it as indicated. The magnets will also tend to swing into position 90 degrees in a horizontal plane from the position shown as the reluctance between the magnets and tipped ring is lowest in that position. It is therefore seen that when the axis about which the ring is tilted is 45 degrees to the north and south line, there will be a large deviation of the magnet from its correct position. On the other hand, if the magnet is mounted above the ring and pivoted at the center of the ring in such a manner that the center of the ring remains fixed relative to the center of the magnet and the ring is tilted as indicated in Fig. 4, the air gap between the magnet and the ring on the left will be considerably less than that on the right and the magnet will be tipped to the left as represented making the disparity of the gaps still greater, so that the tipping effect of the magnetic forces will be further magnified, the final angle of tilt of the magnets being established when the pendulous torque equals the magnetic torque. Due to the nonlinear relation of the reluctance between the magnet poles and the ring relative to the gap spacing, the total reluctance of the magnetic circuit of the magnet for a given average of the two gaps is a maximum when the gaps are equal. Therefore, this total reluctance will be a minimum for a given tilt angle of the ring when the angular position of the magnet in a horizontal plane is as indicated in Fig. 7 where $x—x$ represents the ring tilt axis, so that again when the axis about which the ring is tilted is 45 degrees to north and south, there will be a large deviation of the magnet from its correct heading due to its tendency to assume a position perpendicular to the axis about which the ring is tilted. This tendency is opposite to that described in connection with Fig. 3. Therefore, it would be expected that some pivot position intermediate between that of Fig. 3 and that of Fig. 4 would eliminate the error. That such a surmise is sound is borne out by experiment as well as by the following analysis. In Fig. 5 the ring in effect rotates about the pivot point of the magnet as a center when it is tilted (tilted position of ring 22, Fig. 5), and if this pivot point is raised to the proper position, then when the ring tilts to the same angle as previously considered, the center of the ring is in effect displaced to the left. This has two effects. First, the gap on the left $gl$ is increased and that on the right $gr$ is decreased as compared to Fig. 4. Furthermore, the component of force downward due to the magnetic pull on the left is a smaller percentage of the total due to the change of angle, whereas that on the right becomes slightly larger. The net result, with the proper position of the pivot 15, is to keep the downward components of force on the two ends of the magnet practically equal. Therefore the magnets remain essentially level and the difference between the gaps is still further reduced below that obtained with the arrangement of Fig. 4. The net result is that the total reluctance of the magnet circuit of the permanent magnets in the tilted position of the ring is essentially the same when the ring is not tilted, and also essentially the same as it is when the ring is tilted and the magnet is rotated through a horizontal angle of 90 degrees from the position represented in Fig. 5. Any tendency, therefore, of the magnet to assume any particular position relative to the axis of the tilt of the ring is reduced to a minimum, and as a matter of practice, to an almost negligible quantity. By such arrangement tilting of the ring does not cause a compass error in the position of the magnet.

There are other minor sources of error associated with the tilt of the ring and the vertical component of the earth's field; one which may be called a field distortion error and the other a dip error. These errors can be made to substantially cancel each other by a proper choice of the pivot position, one such position being that represented in Fig. 1, corresponding closely to the arrangement of Fig. 5 in these respects.

If the transmitter has its coupling coils spaced apart as represented for the coupling coils 34 and 35 of the receiver, or if the ends of such coils merely abut each other, it is found that the flux of the rotor magnets 14 produces in conjunction with the current in the coupling coils a pronounced locking tendency when the rotor is in such position that its magnetic axis bisects the dividing line between the coupling coils. Thus if the coils 24 and 25 of the transmitter did not overlap but were separated like coils 34 and 35 of the receiver, the transmitter would have unstable zero points in its torque curve for the rotor position shown in Fig. 2 and for rotor positions 90, 180, and 270 degrees from the position shown. It would have stable or locking points in its torque curve in positions 45 and 135 degrees in either direction from the position shown. Such locking torque may be reduced to an undetectable minimum by having the coils 24 and 25 of the transmitter span an arc of 120 degrees and to overlap uniformly as represented. The reason for such locking torque and for its elimination by such overlapping can be explained by mathematical formula as follows:

It it is assumed that the magnet is symmetrical, then the flux from the magnet entering the magnetic ring, when not saturated, can be represented by the following formula:

Let B=flux per unit length of arc which enters the ring at some location on a radius B, Fig. 6, making an angle $x$ with the axis of the magnet.

1. Then $B = B_1 \cos x + B_3 \cos 3x + B_5 \cos 5x \ldots$
  Where $B_1$, $B_3$, etc. are coefficients of the harmonics in a particular Fourier series.

If it is further assumed that the average torque-producing current in coils A, Fig. 6, is proportional to the net flux linkages in these coils produced by the flux B, then the torque exerted on the magnet by the A coils turns out to be:

$$2. \quad T_A = -4N^2K \left\{ \sum_{V=1}^{V=\infty} \frac{Bv}{V^2} \sin Vr \sin V\theta \right\} \left\{ \sum_{U=1}^{U=\infty} \frac{Bu}{U} \sin Ur \sin U\theta \right\}$$

Where V and U are odd integers. This means that the expression in each bracket is the sum of a series in which V takes on all the values of the coefficients of $x$ in Equation 1; in other words, 1, 3, 5, 7, etc., and similarly for U, except that V and U vary independently. Therefore, the expression in the first set of brackets of Equation 2 can be written:

$$B_1 \sin x \sin \theta + \frac{B_3}{9} \sin 3x \sin 3\theta + \frac{B_5}{25} \sin 5x 5\theta \ldots \text{etc.}$$

and, similarly, for the second set of brackets. The only difference between the expressions in the first and second brackets of Formula 2 is that one has the parameter $V^2$ in the denominator, and in the other the corresponding parameter U occurs to the first power. In Formula 2, $r = \frac{1}{2}$ the angle covered by one coil, Fig. 6.

N is the number of turns.

K is a constant of proportionality whose value depends on the impedance of the coil circuit, the radius of the ring, and the units employed.

V and U are coefficients which may have any of the values of the coefficients of $x$ in Formula 1.

Bv or Bu = $B_1$, $B_3$, or $B_5$—in Formula 1 when V or U = 1, 3, 5, respectively.

The value of torque produced by the "D" coils, Fig. 6, can be obtained immediately from Formula 2 by substituting for $\theta$  $\left(\theta + \frac{\pi}{2}\right)$ When this is done and the two torques are added together, the resulting torque "To" considering all harmonics up to and including the seventh is given by the following:

3.  $To = -4N^2K$ ($B_1B_3$ sine $r$ sine $3r$ ($\frac{1}{3}+\frac{1}{9}$) sine $4\theta$
        $+B_1B_5$ sine $r$ sine $5r$ ($-\frac{1}{5}+\frac{1}{25}$) sine $4\theta$
        $+B_1B_7$ sine $r$ sine $7r$ ($\frac{1}{7}+\frac{1}{49}$) sine $8\theta$
        $+B_3B_5$ sine $3r$ sine $5r$ ($\frac{1}{15}+\frac{1}{45}$) sine $\theta$
        $+B_3B_7$ sine $3r$ sine $7r$ ($-\frac{1}{63}+\frac{1}{47}$) sine $4\theta$
        $+B_5B_7$ sine $5r$ sine $7r$ ($\frac{1}{175}+\frac{1}{245}$) sine $12\theta$ It will be noted in Formula 3 that the higher the value of the subscript after the "B" of each term, the lower the numerical coefficient of harmonic. Furthermore, in any practical arrangement the flux distribution is reasonably near sinusoidal, and the only harmonics of consequence in the flux distribution are the third and the fifth, and even the fifth is relatively slight. Therefore, the only terms of much consequence in the expression for To, Formula 3, are the first two, of which the first is by far the greater. One of the coefficients appearing in the first term is the sine of $3r$. Since $r$ is half the angular span covered by the coil, if the coil covers 120 degrees of a circle, $r$ is 60 and the sine of $3r$ is zero. Moreover, the sine of $r$ is .866 as is likewise the sine of $5r$. Therefore, by making the coil angle 120 degrees, the first term in the right-hand side of Equation 3, by far the largest, is entirely eliminated; and the second term which is small anyway is somewhat reduced. While this theory is somewhat involved, it may be stated that in actual practice the large locking torque occasioned by a coupling coil arrangement, such as is illustrated in Fig. 6, in the transmitter was reduced to an undetectable quantity by making the coupling coil span cover 120 degrees, as illustrated in Fig. 2. This feature is generally applicable to second harmonic type of transmitters and is not dependent upon the nature of the indication to be transmitted or the particular means for producing the unidirectional flux field of the transmitter rotor.

Another kind of error in the transmitter may be introduced by the receiver because if the transmitter and receiver excitation circuits are made alike with respect to power factor angle, any relative angular displacement between the transmitter magnets and the receiver magnets will cause torques of approximately equal magnitudes to be produced in each device. Consequently, any torque necessary to overcome friction or inertia in the receiver requires an equal and opposite torque of the transmitter, which is thereby deflected from its true heading by an amount depending on the ratio between this "feedback" torque and the stiffness of coupling between the transmitter magnets and the earth's magnetic field. Hence, for a given friction torque in the receiver, for instance, there would be two errors: (1) the angular displacement between transmitter and receiver necessary to cause the necessary coupling torque between the two devices, and (2) the angular displacement of the transmitter magnets from their correct heading caused by the torque acting on the transmitter. Moreover, the direction of these two errors is such that they would be additive. The significance of this additional error becomes still more important when more receivers than one are operated simultaneously from one transmitter, which is possible with the arrangement herein described. In this case not only is the deflection of the transmitter magnets from the true heading increased due to larger load, but also any sticking or mechanical interference in one receiver moving system will affect the other receivers seriously on account of the error of heading of the transmitter element occasioned by the faulty indicator. This effect is particularly important on military aircraft where one of the receivers may be damaged in combat.

By properly adjusting the impedance phase angle of the coupling winding system, Fig. 2 previously described, and also adjusting the phase angle of the exciting currents in either or both the transmitter and receiver cores, I have found that the torque the receiver produces on the transmitter can be reduced to substantially zero without appreciably reducing the torque which the transmitter produces on the receiver, and in fact, the torque of the receiver can actually be increased. The following analysis explains how the proper torque relations can be obtained.

While it is possible to make a system of the type described here having locking torques, it is one of the objects of this invention to eliminate such locking torques as have been described previously herein by the overlapping of the coupling coils of the transmitter, and therefore, it will be assumed in the following analysis that locking torques do not exist. It will further be assumed that each instrument by itself, when its coupling coils are loaded with fixed equal impedances, or even short circuited, will have no locking torques. It will also be assumed that when the transmitter and receiver are operating together, the second harmonic circuit impedances are sufficiently constant so that the total second harmonic current can be regarded as the time-vector sum of $$\frac{Ec1}{Z} + \frac{Ec'1}{Z}$$

where Ec1 is the second harmonic voltage generated by the transmitter in one circuit, Ec'1 the second harmonic voltage generated by the receiver in the same circuit, and $Z$ the impedance of the second harmonic circuit involved. Similarly, the current in the other second harmonic circuit may be represented by $$\frac{Ec2}{Z} + \frac{Ec'2}{Z}$$

While the latter two assumptions are made without submitting mathematical proof, experience shows that they are at least approximately true. Now, the two currents $$\frac{Ec1}{Z} \text{ and } \frac{Ec2}{Z}$$

have the same phase, and their relative magnitudes depend on the angular position of the transmitter magnets, and conversely, these two currents establish an alternating current field in the region of the magnets whose direction depends on their relative value. Moreover, it can be shown that if there is no locking, $\frac{Ec1}{Z}$ is equal to $I_2 \sin\theta$, and $\frac{Ec2}{Z}$ is equal to $I_2 \cos\theta$ where $I_2$ is the maximum value of $$\frac{Ec1}{Z} \text{ and } \frac{Ec2}{Z}$$

and $\theta$ is the angular heading of the magnets of the transmitter, with respect to the axis of the $$\frac{Ec2}{Z}$$

component. Therefore, the direction of the field set up by the two components of current $$\frac{Ec1}{Z} \text{ and } \frac{Ec2}{Z}$$

will be the same as the heading of the transmitter magnet, and the magnitude of the field will be proportional to the square root of the sum of the squares of these currents, or a constant $KI_2$, where $K$ is the proportionality constant. In a similar manner the same currents produce a field of greater or less magnitude, depending on the design, but of exactly the same heading in the receiver. Therefore, the currents $$\frac{Ec1}{Z} \text{ and } \frac{Ec2}{Z}$$

can be considered as a combined single current $I_2$, whose average value with respect to time is constant but which flows in two coils, one in the transmitter and one in the indicator, whose headings or axes are the same as the heading of the magnets producing the current, in this case the transmitter magnets. Consequently, this current $I_2$ never produces any torque on the transmitter because the field corresponding to the current is in line with the transmitter magnets, whereas torque is produced on the receiver magnets as soon as their heading departs from that of the transmitter magnets.

In a similar manner a set of currents $I_2'$ will be generated by the receiver which will produce no torque on the receiver but will produce torque in the transmitter when the headings of the magnets of the two instruments differ.

The torques thus far considered are torques alternating with respect to time and would have an average value of zero, if the permeabilities of the magnetic circuits were constant with respect to time. However, a study of Fig. 8 shows how saturation of the cores results in the production of a net average torque. Curve $I_2$, Fig. 9, shows the combined second harmonic current generated by the transmitter and the voltage $E_2$ that causes $I_2$ to flow. This voltage is produced by the change in the amount of the permanent magnet flux linking the coupling coils, said change in flux being caused by the change in permeability mu, of the core, resulting from the fundamental excitation curve $I_t$, Fig. 8. Since $E_2$ is proportional to the rate of change of flux $E_2$ is 90 degrees on the second harmonic base, or 45 degrees on the fundamental base behind the phase of permeability curve mu. For the sake of completeness, the fundamental excitation frequency curve $V_t$ and the fundamental excitation flux curve $\theta_t$ are included in Fig. 8. Figs. 8 and 9 could be made as one figure but the curves are separated, as shown, for the sake of clarity, but the two sets of curves are plotted to the same time coordinates. The curve mu is the same in Figs. 8 to 11. Fig. 9 is illustrative of a low power factor second harmonic circuit, the curve $I_2$ being almost 90 degrees in time phase behind the voltage producing it, and in general represents what could be expected under ordinary conditions with no power factor adjustments of the circuits. If, now, the power factor of the receiver excitation circuit is made identical with that of the transmitter, the phase of the permeability variation and the phase of the second harmonic voltage and current resulting from it will be the same as in Fig. 9. Hence, insofar as time phase (not direction in space) is concerned, $I_2$ could also be considered the current produced by the receiver, and mu the permeability of the receiver. It will be noticed, however, that $I_2$ is positive when mu is low, and negative when mu is high. Consequently, if $I_2$ is considered to be the current produced by the receiver, and mu the permeability of the transmitter, the current $I_2$ produces more field in the transmitter when $I_2$ is negative than when it is positive. Hence, if the receiver magnets producing $I_2$ are displaced angularly from the transmitter magnets, the net field produced by $I_2$ in the transmitter causes a torque to be developed in the transmitter. Similarly, a torque is produced in the receiver at the same time. Moreover, any attempt to change the value of the torque in the transmitter by simply changing the magnitude of the magnets or second harmonic impedance results in substantially the same percentage change in the torque of the receiver.

However, if phase shifting impedances $Z_1$ and $Z_2$, such as resistances, are added to the second harmonic circuits, either in the windings or as special circuit elements as indicated in Fig. 2, so as to make the impedance power factor angle, for example, 45 degrees, and an impedance $Z_E$, such as a resistance, is also added to the excitation circuit of the receiver so as to make the phase angle of the receiver excitation current 22½ degrees on the fundamental base, or 45 degrees on the second harmonic base, ahead of the transmitter exciting current, then the current relations shown in Figs. 10 and 11 result.

In Fig. 10 the permeability mu' of the receiver has been advanced in phase due to the increase in power factor of the exciting winding circuit of the receiver and no longer coincides with the permeability mu of the transmitter. Also, due to the improvement in power factor of the coupling winding circuits, $I_2$ of the transmitter now lags the voltage $E_2$ of the transmitter by only 45 degrees. The advance in phase of mu' of the receiver causes the coupling winding voltage thereof to be advanced in phase and is represented by $E'_2$, Fig. 11, and hence, is advanced 45 degrees ahead of the voltage $E_2$ of the transmitter. The combined coupling winding current of the receiver may now be represented as $I'_2$, Fig. 11; only 45 degrees behind the voltage, again due to the improvement in power factor of the coupling winding circuits.

It will now be noted from Fig. 10 that the current $I_2$ of the transmitter is 180 degrees out of phase with the permeability mu' of the receiver. Hence, such current produces torque in the receiver. However, the current $I'_2$ of the receiver is 90 degrees out of phase with the permeability mu of the transmitter, and the average permeability mu is the same during the positive half-cycle of $I'_2$ as during the negative half-cycle. Hence, the receiver current $I'_2$ again produces no torque in the transmitter regardless of the rotor magnet positions. This explanation assumes that $I_2$ is the resultant current pattern produced in all of the coupling windings of the transmitter and that it flows in the receiver, and that $I'_2$ is the resultant current pattern produced in all of the couping windings of the receiver and that it flows in the transmitter. These currents are of course imaginary and do not actually exist, but the flux and torque results are the same as if such currents existed.

If $\theta_{z2}$ represents the power factor angle of the impedance of the second harmonic circuit, considered positive when leading, and $\theta_c$ represents the phase angle between the exciting current of the transmitter core and that of the indicator core, considered positive when the transmitter exciting current leads the indicator exciting current, then the condition for zero torque on the transmitter is I.  $\qquad \theta_{z2} = 2\theta_c \pm n180°$ Where $n$ is any integer including zero; and the condition for maximum torque on the indicator is II.  $\qquad \theta_{z2} = 90 - 2\theta_c \pm n180°$ The relation satisfying both of these two equations exactly gives $\theta_{z2} = \pm 45°$. However, the Equation I is the only one which is very critical because the second being the condition for a maximum, the rate of change of torque with respect to angle at this point is zero. Hence, it can be said that any relation of $\theta_{z2}$ and $2\theta_c$ which very nearly satisfies Equation I and approximately satisfies Equation II will produce the desired results. Consequently, a system is thus provided consisting of a transmitter and a receiver in which the receiver is urged to follow the transmitter in angular relation by an electro-magnetic coupling torque which is a function of the displacement angle of the receiver relative to the transmitter, said system, however, producing substantially no tendency for the transmitter to be affected by the angular position of the receiver.

Obviously, other relations between exciting current, phase angles, and power factor angle of the second harmonic circuit will produce zero "feedback" torque, but the 45-degree relation explained is very satisfactory, and the reduction in receiver torque caused by increasing the impedance of the second harmonic circuits is not great. In fact, series capacitors in the second harmonic circuits would accomplish the same phase angle result and at the same time, increase the torque on the receiver. Also, obviously, capacitors could be put in the indicator excitation circuit to make the angle more leading. This feature is generally applicable to alternating current synchronous type telemetering apparatus and is not confined to apparatus of the second harmonic type and of course is independent of the nature of the indication to be transmitted.

I have thus provided a remote indicating compass in which the compass magnets are made very much stronger than usual and serve for the additional purpose of a transmitter rotor, the stator element of which may tip relative to the compass magnets in order that the apparatus may be used on an airplane and the like and still transmit a true compass indication, even when the stator is tipped from a level position. To obtain this result and have the compass magnets free at all times to respond and line up with the horizontal component of the earth's magnetic field, it is necessary that the magnetic influence on the compass magnets tending to produce rotation of both the stator core and windings of the transmitter be made symmetrical under the various conditions and relative positions encountered. This is accomplished by using the adjustable magnetic strip 46, if necessary; by a proper positioning of the compass magnets, the pivot, and the ring core of the transmitter, as explained previously, to avoid certain rotary positions of different reluctance between magnets and core when the latter is tipped, and to avoid errors associated with the vertical component of the earth's magnetic field, to overlap the coupling windings of the transmitter so that current flow therein will not produce rotary torque or locking tendency on the compass magnets, and finally to adjust the power factor relations of the electrical system so that torque is transmitted only from transmitter to receiver and not from receiver to transmitter.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a remote indicating system, an electrical transmitter having a ring-shaped magnetic core, a distributed exciting winding thereon and separate coupling coils at different positions on said core for transmitting position signaling currents, a rotor for said transmitter which is positioned in accordance with the indication to be transmitted and having permanent magnet means for producing a unidirectional field in the stator to vary the currents in the coupling coils thereof in accordance with rotary movements of the rotor, said coupling coils being overlapped for the purpose and to the extent necessary to prevent locking torques on the rotor.

2. In a remote indicating system, a signaling device of the saturable core second harmonic type comprising a stator having a ring-shaped magnetic core, an alternating current exciting winding uniformly distributed thereon and separate quadrature spaced coupling coils on said core, a rotor cooperating with said stator having permanent magnet means for producing a unidirectional field diametrically of said stator, said quadrature spaced coupling coils each extending over an arc of 120 degrees of said stator core so as to overlap for the purpose of preventing locking torque on the rotor.

3. A telemetering system comprising a transmitter unit and a receiver unit, each unit comprising a stator member and a rotor member, each stator member comprising a ring core of saturable magnetic material carrying winding means thereon provided with polyphase second-harmonic connections and single phase excitation connections and each rotor member comprising a rotatable, poled permanent magnet, circuit means for connecting the single phase connections of the transmitter and receiver stator winding means to a common source of periodically varying current, circuit means interconnecting the polyphase connections of the transmitter and receiver stator winding means to permit flow of induced, second-harmonic currents between the transmitter and receiver units, a first phase-shifting impedance means electrically connected in the excitation circuit of one of said units to shift the relative phase angle of the transmitter and receiver excitation currents, and a second impedance means electrically connected in the circuit including said polyphase connections to shift phase angle of second harmonic currents flowing between transmitter and receiver units, said first and second impedance means being dimensioned so that the resulting phase shift causes the maximum and minimum values of the transmitter generated second-harmonic currents flowing in the receiver approximately to correspond in time phase with the minimum and maximum values of permeability in receiver core permeability variation cycle and the maximum and minimum values of receiver generated second-harmonic currents flowing the transmitter to be displaced approximately 90 electrical degrees in time phase from the maximum and minimum values of permeability in the transmitter core permeability variation cycle whereby rotation of the transmitter magnet is effective in producing in the receiver a torque tending to rotate the receiver magnet in angular correspondence with the transmitter magnet but rotation of the receiver magnet produces no feedback torque in the transmitter tending to rotate the transmitter magnet.

4. In a self synchronous transmission system, transmitter and receiver units each having single phase excitation circuit connected to a common source of periodically varying current and polyphase circuit connections, circuit means for interconnecting the polyphase circuit connections of the transmitter and receiver units for transmission of signal currents therebetween, first phase-shifting impedance means electrically connected in the excitation circuit of one of said units to shift the relative phase of the excitation currents in the transmitter and receiver units and second phase-shifting impedance means connected in the circuit of said polyphase connections to shift the phase of the signal currents flowing between the transmitter and receiver units, said impedance means being dimensioned to cause approximately a 90 degree phase shift in the signal currents flowing from the receiver unit to the transmitter unit and approximately a 45 degree phase shift in the same direction of both the signal currents flowing from the transmitter unit to the receiver unit and the receiver unit excitation current relative to the transmitter unit excitation current whereby the transmitter is effective to control the receiver but the receiver exerts no influence on the transmitter.

ALLEN T. SINKS.

REFERENCES CITED

The following references are of record in the file of this patent:

UNITED STATES PATENTS

| Number | Name | Date |
|---|---|---|
| 1,091,653 | Hall | Mar. 31, 1914 |
| 1,431,627 | Bristol | Oct. 10, 1922 |
| 1,628,450 | Blanchard | May 10, 1927 |
| 2,053,409 | Urfer | Sept. 8, 1936 |
| 2,196,809 | Hoadley | Apr. 9, 1940 |
| 2,248,748 | Draper et al. | July 8, 1941 |
| 2,261,309 | Stuart | Nov. 4, 1941 |
| 2,308,566 | Noxon | Jan. 19, 1943 |
| 2,313,682 | Stuart | Mar. 9, 1943 |
| 2,323,566 | Peterson | July 6, 1943 |
| 2,342,637 | Bechberger | Feb. 29, 1944 |
| 2,356,186 | Somers | Aug. 22, 1944 |
| 2,361,790 | Noxon | Oct. 31, 1944 |

FOREIGN PATENTS

| Number | Country | Date |
|---|---|---|
| 98,414 | Sweden | Mar. 19, 1940 |